United States Patent
Mosko

(10) Patent No.: US 9,535,968 B2
(45) Date of Patent: Jan. 3, 2017

(54) SYSTEM FOR DISTRIBUTING NAMELESS OBJECTS USING SELF-CERTIFYING NAMES

(71) Applicant: Palo Alto Research Center Incorporated, Palo Alto, CA (US)

(72) Inventor: Marc E. Mosko, Santa Cruz, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 242 days.

(21) Appl. No.: 14/337,026

(22) Filed: Jul. 21, 2014

(65) Prior Publication Data
US 2016/0019275 A1    Jan. 21, 2016

(51) Int. Cl.
G06F 17/30    (2006.01)
H04L 29/08    (2006.01)
H04L 29/06    (2006.01)

(52) U.S. Cl.
CPC ... *G06F 17/30575* (2013.01); *G06F 17/30876* (2013.01); *H04L 65/4084* (2013.01); *H04L 67/1095* (2013.01); *H04L 67/327* (2013.01)

(58) Field of Classification Search
CPC ............................................... G06F 17/30628
See application file for complete search history.

(56) References Cited

U.S. PATENT DOCUMENTS

| 817,441 A | 4/1906 | Niesz |
|---|---|---|
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

Sriram Ramabhadran, Joseph M. Hellerstein, Sylvia Ratnasamy, and Scott Shenker, "Brief Announcement: Prefix Hash Tree", ACM, PODC'04, Jul. 25-28, 2004, St. Johns, Newfoundland, Canada, p. 368.*

(Continued)

*Primary Examiner* — Cheryl Lewis
(74) *Attorney, Agent, or Firm* — Shun Yap; Park, Vaughan, Fleming & Dowler LLP

(57) ABSTRACT

A content replication system can cache nameless Content Object across multiple replica servers in a Content Centric Network (CCN). During operation, a CCN client can obtain a nameless Content Object from one or more content-hosting services by disseminating an Interest for a data collection, and receives a Content Object that includes a manifest for the data collection. The manifest can include Content Object hash (COH) values for a set of other Content Objects of the data collection. The client then determines a name prefix for a content-hosting service that hosts the data collection, and generates another Interest for a Content Object of the data collection. This Interest's name includes the name prefix for the content-hosting service, and also includes a COH value for the respective Content Object. The client disseminates the new Interest over CCN to obtain the respective Content Object of the data collection.

25 Claims, 8 Drawing Sheets

(56) References Cited

U.S. PATENT DOCUMENTS

| | | |
|---|---|---|
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,128,623 A * | 10/2000 | Mattis ............... G06F 17/30902 707/695 |
| 6,128,627 A * | 10/2000 | Mattis ............... G06F 17/30315 |
| 6,173,364 B1 | 1/2001 | Zenchelsky |
| 6,209,003 B1 * | 3/2001 | Mattis .................. G06F 12/023 |
| 6,226,618 B1 | 5/2001 | Downs |
| 6,233,646 B1 | 5/2001 | Hahm |
| 6,289,358 B1 * | 9/2001 | Mattis ............... G06F 17/30902 707/695 |
| 6,292,880 B1 * | 9/2001 | Mattis ............... G06F 17/30902 707/999.007 |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,915,307 B1 * | 7/2005 | Mattis ............... G06F 17/30067 |
| 6,917,985 B2 | 7/2005 | Madruga |
| 6,968,393 B1 | 11/2005 | Chen |
| 6,981,029 B1 | 12/2005 | Menditto |
| 7,007,024 B2 * | 2/2006 | Zelenka ............ G06F 17/30607 707/741 |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046415 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Paterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |

(56) References Cited

U.S. PATENT DOCUMENTS

| | | |
|---|---|---|
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Red |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Red |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |

(56) References Cited

U.S. PATENT DOCUMENTS

| | | |
|---|---|---|
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1* | 1/2014 | Liu .................. H04L 67/18 709/217 |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al., 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of the 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (Pursuit)," http://www.fp7-pursuit.ew/PursuitWeb/. downloaded Mar. 11, 2015.

"The FP7 4ward project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

(56) References Cited

OTHER PUBLICATIONS

B. Ahlgren et al., 'A Survey of Information-centric Networking' IEEE Commun. Magazine, Jul. 2012, pp. 26-36.
B. Lynn$2E.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Walters, 'Collusi.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren, "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control System (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19, No. 4, ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architecture." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4, 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).
V. Jacobson et al., 'Networking Named Content,' IEEE CoNEXT '09, Dec. 2009.
Jacobson et al., "Custodian-Based Information Sharing," Jul. 2012, IEEE Communications Magazine: vol. 50 Issue 7 (p. 3843).

(56) References Cited

OTHER PUBLICATIONS

Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnosis, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. Eurocrypt 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37, No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—Africacrypt 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "Easier: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88 , Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

(56) References Cited

OTHER PUBLICATIONS

The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29, No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

* cited by examiner

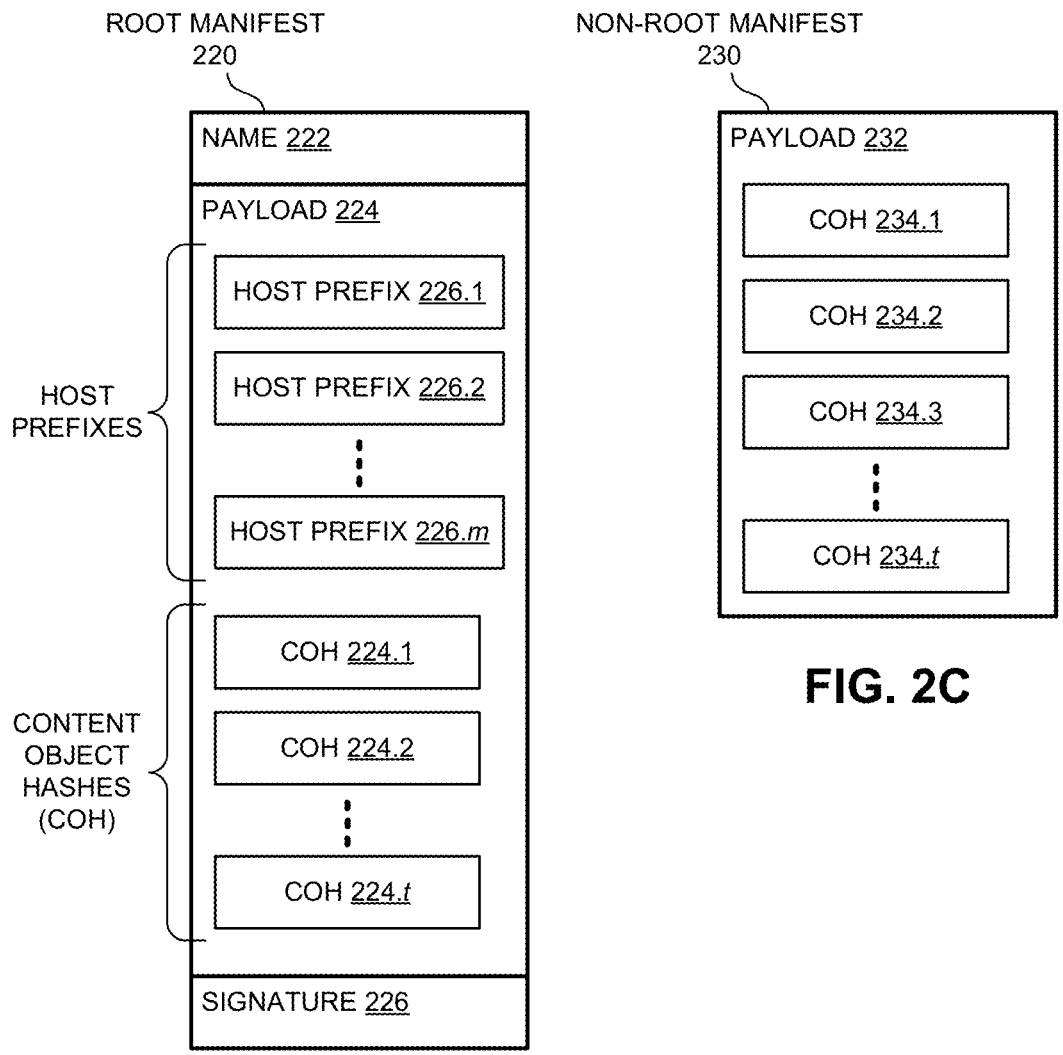

SYSTEM FOR DISTRIBUTING NAMELESS OBJECTS USING SELF-CERTIFYING NAMES

RELATED APPLICATION

The subject matter of this application is related to the subject matter in a co-pending non-provisional application by the same inventors as the instant application and filed on the same day as the instant application entitled "AGGREGATE SIGNING OF DATA IN CONTENT CENTRIC NETWORKING," having Ser. No. 14/231,515, and filing date 31 Mar. 2014.

BACKGROUND

Field

This disclosure is generally related to a content centric network (CCN). More specifically, this disclosure is related to replicating nameless Content Objects across various content-hosting services.

Related Art

The proliferation of the Internet and e-commerce continues to fuel revolutionary changes in the network industry. Today, a significant number of information exchanges, from online movie streaming to daily news delivery, retail sales, and instant messaging, are conducted online. An increasing number of Internet applications are also becoming mobile. However, the current Internet operates on a largely location-based addressing scheme. The most ubiquitous protocol, the Internet Protocol (IP), is based on location-based address. That is, a consumer of content can only receive the content by explicitly requesting the content from an address (e.g., IP address) closely associated with a physical object or location. A request that has a URL with an IP address for a specific organization causes the request to go to that organization's servers and not to those of another organization.

Recently, content centric networking (CCN) architectures have been proposed in the industry. CCN brings a new approach to content transport. Instead of having network traffic viewed at the application level as end-to-end connections over which content travels, content is requested or returned based on its unique name, and the network is responsible for routing content from the provider to the consumer.

With content centric networks, an Interest message includes a name for a Content Object, and a client can disseminate the Interest over CCN to obtain the Content Object from any CCN node that hosts the Content Object. The Interest is forwarded toward a CCN node that advertises at least a prefix of the Interest's name. If this CCN node can provide the Content Object, this node can return the Content Object (along the Interest's reverse path) to satisfy the Interest.

Publishers oftentimes want to replicate their content across various host servers. Unfortunately, doing so in CCN requires these host servers to advertise the content's name or name prefix so that CCN routers can know how to forward Interests for this content toward the third-party servers. If a host server stores Content Objects for a large number of publishers, the host server's neighboring nodes may need to update their forwarding tables to include entries for each name prefix associated with the Content Objects stored by the host server. This places a significant burden across CCN routers. To make matter worse, if CCN routers do not implement a large enough forwarding table, it is possible that these CCN routers may not be able to forward Interests to a host server for all Content Objects available from the host server.

SUMMARY

One embodiment provides a client that can obtain a nameless Content Object from one or more content-hosting services. During operation, the client can disseminate an Interest for a data collection, and receives a Content Object that includes a manifest for the data collection. The manifest can include Content Object hash (COH) values for a set of other Content Objects of the data collection. The client then determines a name prefix for a content-hosting service that hosts at least a portion of the data collection, and generates a second Interest for a respective Content Object of the data collection. The second Interest's name includes the name prefix for the content-hosting service, and also includes a COH value for the respective Content Object. The client disseminates, over a Content Centric network (CCN), the second Interest to obtain the respective Content Object of the data collection.

In CCN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms describe elements of a CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847, 814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across CCN, which CCN routers can propagate toward a storage device (e.g., a cache server) or a data producer that can provide the requested data to satisfy the request or Interest.

A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

In some embodiments, the other Content Objects of the data collection do not include a name, and are accessed based on their Content Object hash value.

In some embodiments, the manifest includes a root manifest that specifies a name prefix for one or more content-hosting services that host at least a portion of the data collection.

In some variations to these embodiments, the root manifest includes a signature for the root manifest.

In some variations to these embodiments, while determining the name prefix for the content-hosting service, the client obtains the name prefix from the root manifest.

In some embodiments, the manifest includes a non-root manifest.

In some variations to these embodiments, the non-root manifest does not include a name.

In some variations to these embodiments, the non-root manifest does not include a signature for the non-root manifest.

In some variations to these embodiments, while obtaining the name prefix for the content-hosting service, the client obtains the name prefix from a root manifest associated with the data collection.

In some embodiments, the other Content Objects of the data collection include a set of non-root manifests, or a set of data Content Objects.

One embodiment provides a content-hosting server that can store nameless Content Objects, and can process an Interest that includes a Content Object hash (COH) value to return a nameless Content Object whose hash value matches the COH value. During operation, the server can receive an Interest whose name includes a name prefix for the content-hosting service, and also includes a COH value for a Content Object hosted by the content-hosting service. The server obtains the Content Object whose hash matches the COH value, and returns the Content Object, along a face from which the Interest was received, to satisfy the Interest.

In some embodiments, the Content Object does not include a name.

In some embodiments, the Content Object does not include a signature.

In some embodiments, the Content Object includes metadata and/or a payload.

In some embodiments, the Content Object includes a manifest for a data collection, such that the manifest includes COH values for a set of other Content Objects of the data collection.

BRIEF DESCRIPTION OF THE FIGURES

FIG. 2B illustrates an exemplary root manifest in accordance with an embodiment.

FIG. 2C illustrates an exemplary non-root manifest in accordance with an embodiment.

In the figures, like reference numerals refer to the same figure elements.

DETAILED DESCRIPTION

Figure 1:
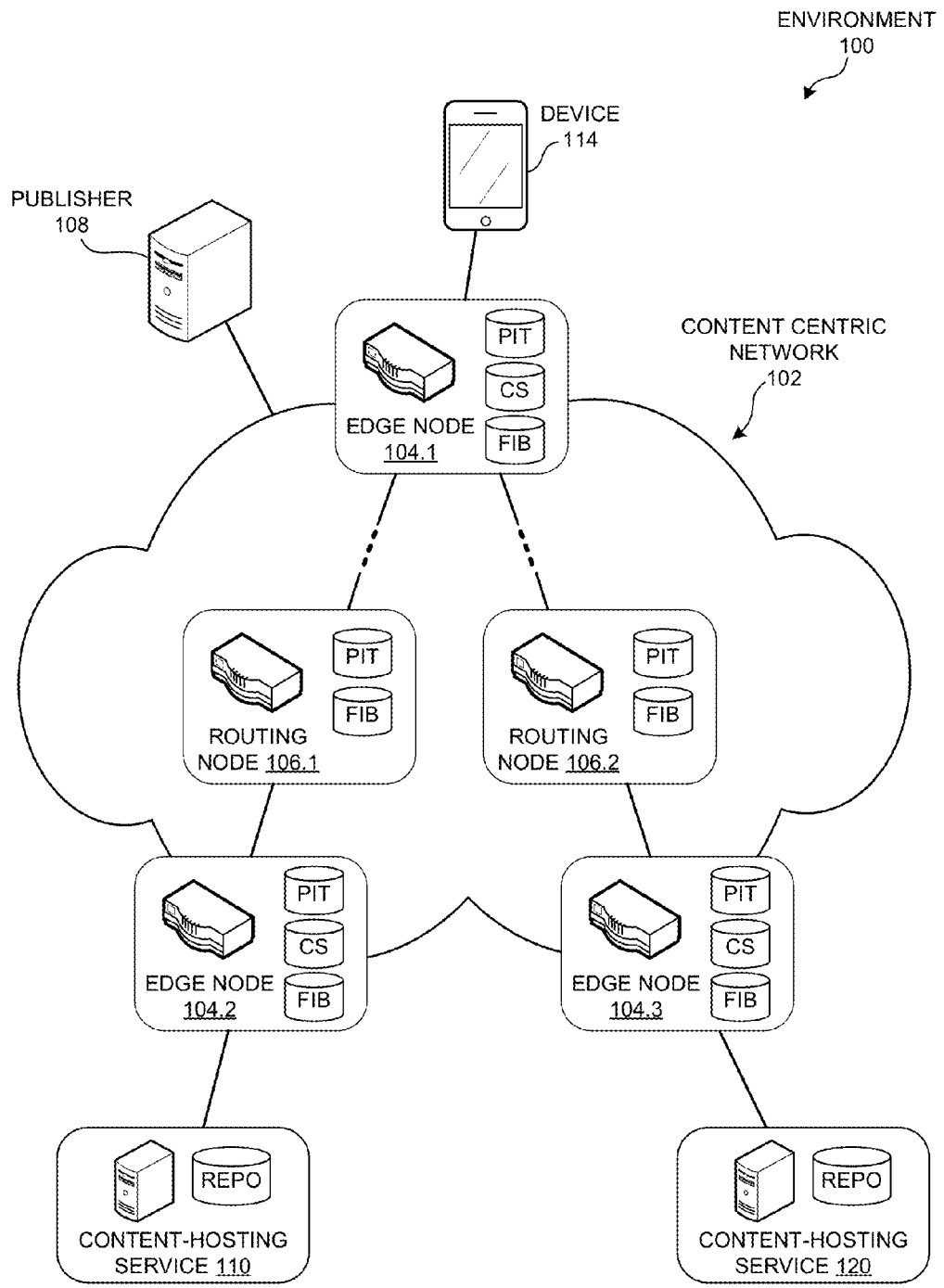
FIG. 1 illustrates an exemplary network environment that facilitates replicating nameless objects across a plurality of content-hosting services in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a content replication system that solves the problem of caching a Content Object across multiple replica servers that do not advertise a common name prefix. To solve this problem, the content replication system allows a publisher to create nameless Content Objects, which are addressed by a Content Object hash (COH) self-certifying name.

These nameless Content Objects are truly placeless objects, as they do not include a name, and thus don't have an implied routing. The publisher can host these nameless Content Objects across various replica servers (or hosting services), even when these replica servers advertise only their own name prefix to other CCN nodes. The publisher can create a Manifest for a nameless Content Object (or a hierarchy of Manifests for a collection of nameless Content Objects), and can provide the Manifest (or a root Manifest) to a client that requests these Content Objects so that the client can generate Interests to request the nameless Content Objects directly from the replica server(s). The Manifest (or root Manifest) includes name prefixes for the replica servers that host the nameless Content Objects, and includes Content Object hash (COH) values that can be used to uniquely identify nameless Content Objects or other non-root Manifests.

For example, a publisher may want to store a collection of Content Objects on any hosting service (e.g., a replica server) that can cache and serve these Content Objects for a specific geographic location. These hosting services can include clusters of cache servers distributed across the globe, and each cluster can have a unique name prefix to allow load balancers to redirect requests to a specific cluster or geographic region. However, if the Content Objects were to have a name embedded into them (and their signature) with the publisher's name prefix, these Content Objects could only be hosted by nodes or services that advertise the publisher's name prefix. The problem is that some of these services may host Content Objects for a large set of publishers, and may only be storing a small number of Content Objects from each publisher. It would place an undesirable burden on the neighboring routers to map name prefixes for all these publishers to these services. In many cases, it may not be possible for a router to create entries in a routing table for all these name prefixes, as doing so may require more routing table entries than are available.

One option is for the publisher to change the name of these Content Objects so that each replica Content Object has a name with a prefix of the hosting service that is caching the replica Content Object. This allows redirecting an Interest specifically to a desired hosting service (e.g., a replica server for a given geographic region). However, doing so causes the replica Content Object with a new name to become a completely different Content Object than the original Content Object, as these two Content Objects have different names and different signatures.

Another possible solution is "encapsulation," which involves encapsulating the publisher's Content Object (whose name includes the publisher's name prefix) into a Content Object whose name includes the replica server's name prefix. For example, a publisher with a name prefix "/marc" can encapsulate a Content Object "/marc/foo" into a Content Object with a name "/alice/foo" to allow a replica server (having a name prefix "/alice") to host the Content Object "/marc/foo." A network node that performs load balancing (e.g., a router or a gateway) can redirect an Interest for "/marc/foo" to the replica server "/alice" by generating and disseminating a new Interest for "/alice/foo." Also, when the replica server returns the Content Object, this network node can decapsulate the Content Object "/marc/foo" from the Content Object "/alice/foo," and returns the decapsulated Content Object.

However, "encapsulation" results in additional computation overhead at this network node, as the network node needs to redirect Interests by generating new Interests, and needs to keep state information for the Interests are being redirected. This network node would also need to be able to detect which Content Objects include an encapsulated Content Object, and needs to spend precious processing time to decapsulate the Content Object "/marc/foo" from the replica Content Object "/alice/foo" before returning the decapsulated Content Object to the client. To make matters worse, allowing a Content Object's name to change can allow for "off-path" attacks that inject malicious or undesired content into an Interest's return path.

Hence, embodiments of the present invention use a named and signed root "Manifest" (and a collection of nameless and unsigned non-root Manifests) to identify nameless Content Objects in the collection, as well as the name prefixes from wherein the data collection can be obtained. A description of "Manifests" (also referred to as "Aggregate Signing Objects") is described in U.S. patent application Ser. No. 14/231,515, entitled "AGGREGATE SIGNING OF DATA IN CONTENT CENTRIC NETWORKING," by inventors Ersin Uzun, Marc E. Mosko, Michael F. Plass, and Glenn C. Scott, filed 31 Mar. 2014), which is hereby incorporated by reference.

Exemplary Network Environment

FIG. 1 illustrates an exemplary network environment 100 that facilitates replicating nameless objects across a plurality of content-hosting services in accordance with an embodiment. Computing environment 100 can include a content centric network 102, which includes a plurality of edge nodes 104 and routing nodes 106 that can forward Interests based on their name or name prefix. Also, edge nodes 104 and routing nodes 106 can return Content Objects, which satisfy the Interest, based on the Content Object's name (for named Content Objects) or based on the Content Object's hash (for nameless Content Objects).

For example, network 102 can be managed by an Internet service provider (ISP), and can include an edge node 104.1 that provides network access to a plurality of client devices. Network 102 can also include edge nodes 104.2 and 104.3 that provide network access to a plurality of content-hosting services (e.g., directly or via a back-haul network) that can host or cache Content Objects for various content producers. A publisher 108 (e.g., a content producer) can store a collection of nameless Content Objects at a content-hosting service 110 (e.g., a content-delivery network or a replication server), as well as a content-hosting service 120. Alternatively content-hosting services 110 and/or 120 may each correspond to a promiscuous caching service run by the ISP, so that each caching service hosts nameless Content Objects using a different name prefix (e.g., a name prefix associated with a particular geographic location).

Note that content-hosting services 110 and 120 do not need to advertise a name prefix associated with the collection. Also, publisher 108 does not need to change a name prefix of the Content Objects to match a name prefix associated with content-hosting service 110 and/or 120, prior to providing the collection to content-hosting services 110 and 120. Rather, publisher 108 can generate a hierarchy of Manifests, such that the root Manifest can include name prefixes for a set of content-hosting services for the collection (e.g., services 110 and 120), as well as Content Object hash (COH) values for a set of nameless Content Objects (e.g., for other Manifests, or for the data objects in the collection).

Device 114 can request the collection by generating and disseminating an Interest that includes the collection's name, such as a name prefix associated with publisher 108, and a name suffix associated with the collection. When device 114 disseminates the Interest, edge nodes 104 and/or routing nodes 106 can forward the Interest to publisher 108, at which point publisher 108 can return the root Manifest to device 114. Alternatively, if a CCN node in network 102 (e.g., edge node 104.1) has cached the root Manifest, this CCN node can return the root Manifest to device 114 without having to forward the Interest to publisher 108.

Device 114 can use the root Manifest to select a content-hosting service 110 from which to request the individual nameless Content Objects of the collection, and uses the COH self-certifying names to generate a request for each nameless Content Object in the collection. For example, device 114 can generate an Interest that includes the name prefix to the selected content-hosting service, and that includes the COH self-certifying name for a respective nameless Content Object. Edge nodes 104 and/or routing nodes 106 can use the name prefix in the Interest's name to forward the Interest to the appropriate content-hosting service, and the content-hosting service can use the COH self-certifying name to select the nameless Content Object that needs to be returned to device 114.

In some embodiments, a publisher can partition a large data object (e.g., a movie stream) into a large collection of data segments, and creates a nameless Content Object for each of these segments. The publisher can also create a hierarchy of Manifests for the collection, which allows a client to obtain any replica of the Content Objects from any content-hosting service that is named in the collection's root Manifest.

In some embodiments, if the existing (e.g., original) root Manifest does not include a name prefix for a content-hosting service that hosts one or more nameless Content Objects in a collection, the content-hosting service can create a new root Manifest that incorporates the existing root Manifest by reference or by inclusion. Device 114 (or any other consumer) can use the new root Manifest (and thus the content-hosting service's name prefix) to obtain the collection because the nameless Content Objects in the collection still have hash values that match the COH self-certifying names as the existing, trusted root Manifest. If device 114 needs to validate the collection's authenticity, device 114 can still use the original root Manifest (which is signed by the publisher) to ensure the received Content Objects all have hash values that match the COH self-certifying names specified in the original root Manifest, or in a non-root Manifest referenced by the root Manifest either directly or indirectly.

Figure 2A:
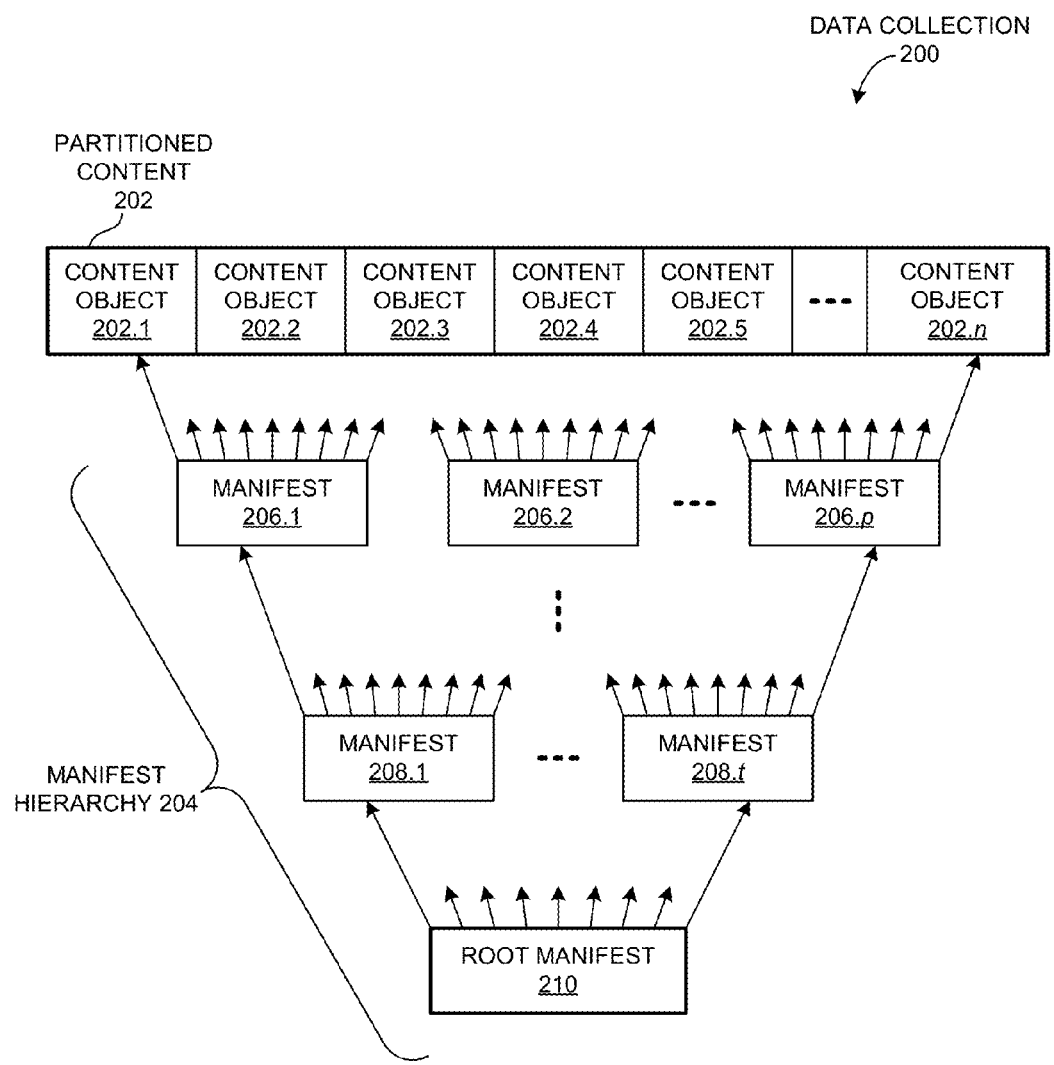
FIG. 2A illustrates an exemplary data collection that includes content which has been partitioned into a plurality of content objects, and a manifest hierarchy for the content objects in accordance with an embodiment.

FIG. 2A illustrates an exemplary data collection 200 that includes data which has been partitioned into a plurality of nameless Content Objects 202, and includes a Manifest hierarchy for the nameless Content Objects in accordance with an embodiment. Specifically, the publisher can partition the data into n nameless Content Objects 202, and can create a Manifest hierarchy 204. Manifest hierarchy can include one or more levels of root Manifest, such that lower-level Manifests (e.g., the root Manifest) reference a next-level Manifest (e.g., Manifests 208) via its COH self-certifying name. While Manifest hierarchy 204 depicts a complete tree, in practice, Manifest hierarchy can include any tree structure that maintains an in-order traversal order. For example, any Manifest in Manifest hierarchy 204 can include COH self-certifying names for nameless Content Objects 202, for other Manifests, or for both Content Objects 202 and other Manifests. Also, the individual Manifests in Manifest hierarchy 204 may each include an arbitrary number of COH self-certifying names, or alternatively, the publisher may generate all Manifests to include an equal number of COH names.

For example, the publisher can create a set of p Manifests 206 for the n Content Objects 202. If the publisher generates each Manifest to include COH self-certifying names for up to m nameless Content Objects, the publisher generates p=n/m Manifests that together include COH values for all n Content Objects 202.

For example, the underlying data may include a 2 GB video stream. The publisher may partition the video stream into n=2 million nameless Content Objects, and may generate p=100,000 first-level Manifests 206 that each includes a COH value for 40 nameless Content Objects 202. The publisher can add non-root Manifests 206 to the collection, and proceeds to generate another level of Manifests for non-root Manifests 206. The publisher can iteratively create additional layers of Manifests until the publisher generates a root Manifest for the collection. If all Manifests include an equal number of COH values, the final set of hierarchical Manifests can include $\log_m n$ Manifest levels.

In some embodiments, the publisher can provide nameless Content Objects 202 (that include the partitioned data object) and the non-root Manifests to the various content-hosting services that are to host the collection. The publisher can host the root Manifest, and/or can provide the root Manifest to any CCN node that has (or will) advertise the collection's name prefix. This allows a client to obtain the root Manifest from the publisher or any CCN node associated with the collection's name prefix, and the client uses the root Manifest to access the non-root Manifests and Content Objects 202 from the content-hosting services.

In some embodiments, a client obtains content objects 202 by first obtaining root Manifest 210 from the publisher (or any other CCN node that caches root Manifest 210), and uses name prefixes and COH self-certifying names in root Manifest 210 to obtain a next level of non-root Manifests 208. The client then uses the name prefixes in root Manifest 210 and the COH self-certifying names in Manifests 208 to obtain the next level of non-root Manifests. The client can continue to process the Manifests (e.g., in a breadth-first order) until the client has obtained nameless Content Objects 202.

FIG. 2B illustrates an exemplary root manifest 220 in accordance with an embodiment. Specifically, root Manifest 220 can include a name 222, a payload 224, and a signature 226. Name 222 includes a name (or name prefix) for the collection. If the collection was generated by partitioning a large data object, name 222 includes the name for the data object from which the collection was generated. Also, signature 226 includes a cryptographic signature, generated based on name 222 and 224, and signed using the publisher's digital certificate.

Payload 224 of root Manifest 220 can include a set of host prefixes 226 that can be used to request the nameless Content Objects in the collection from a content-hosting service. The content-hosting service can host the partitioned Content Objects as well as the nameless non-root Manifests. Payload 224 can also include a set of Content Object hash (COH) values 224, which a content-hosting service can use to match against a nameless Content Object's hash value.

FIG. 2C illustrates an exemplary non-root manifest 230 in accordance with an embodiment. Specifically, non-root Manifest 230 can include a payload 232 that includes a set of Content Object hash (COH) values 224, which a content-hosting service can use to match against a nameless Content Object's hash value. In some embodiments, non-root Manifest 230 is a nameless Content Object which the content-hosting services can store along with the collection's other Content Objects. Hence, like any nameless Content Object, non-root Manifest 230 does not need to include a name or a signature.

Content Publishers

Figure 3:
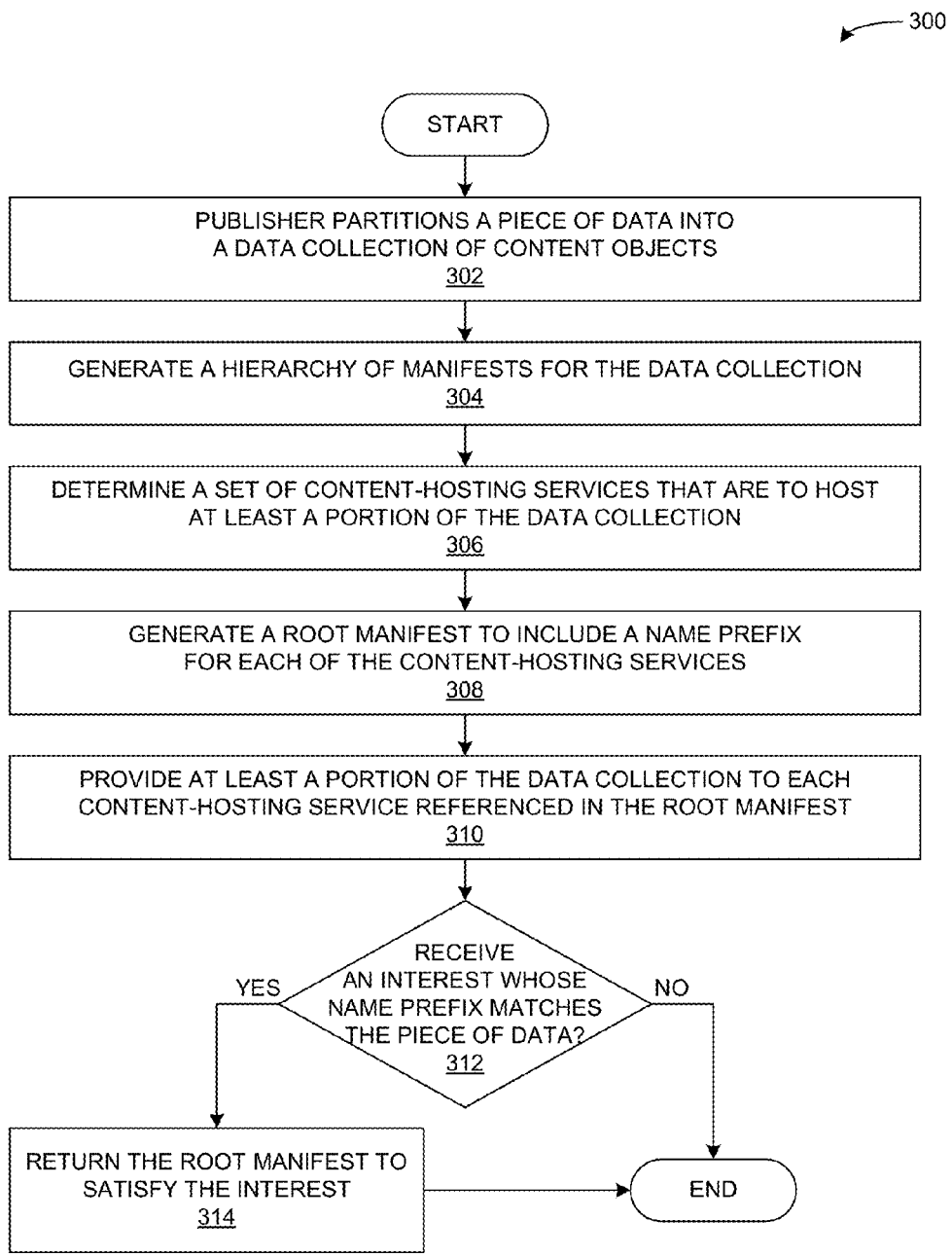
FIG. 3 presents a flow chart illustrating an exemplary method for publishing a data collection of nameless objects across one or more content-hosting services in accordance with an embodiment.

FIG. 3 presents a flow chart illustrating an exemplary method 300 for publishing a data collection of nameless objects across one or more content-hosting services in accordance with an embodiment. During operation, a publisher can partition a piece of data into a data collection of nameless Content Objects (operation 302), and generates a hierarchy of Manifests for the data collection (operation 304). The publisher can determine a set of content-hosting services that are to host at least a portion of the data collection (operation 306), and generates a root Manifest to include a name prefix for each of the content-hosting services (operation 308).

The publisher then provides the data collection (or a portion thereof) to each content-hosting service referenced in the root manifest (operation 310). These content-hosting services may be a replica server operated by the publisher or a third-party service, or they may include any CCN device that volunteers to host the data collection. The publisher can provide to these hosts the nameless Content Objects that make up the data, as well as the Manifests for these nameless Content Objects (e.g., the hierarchy of nameless non-root Manifests).

In some embodiments, if the publisher receives an Interest for the piece of data (e.g., an Interest whose name or name prefix matches the piece of data) (operation 312), the publisher returns the root Manifest to satisfy the Interest (operation 314). For example, the publisher can return the root Manifest via a face from which the Interest was received, at which point the root Manifest is forwarded along the Interest's path traversed in the reverse direction toward the client that disseminated the Interest. The client can use the root Manifest to select a content-hosting service from which to obtain the data collection, and generates Interests to obtain the data collection using a name prefix for the content-hosting service and the Content Object hash values specified in the root Manifest (as well as in any non-root Manifest in the data collection).

Clients

Figure 4:
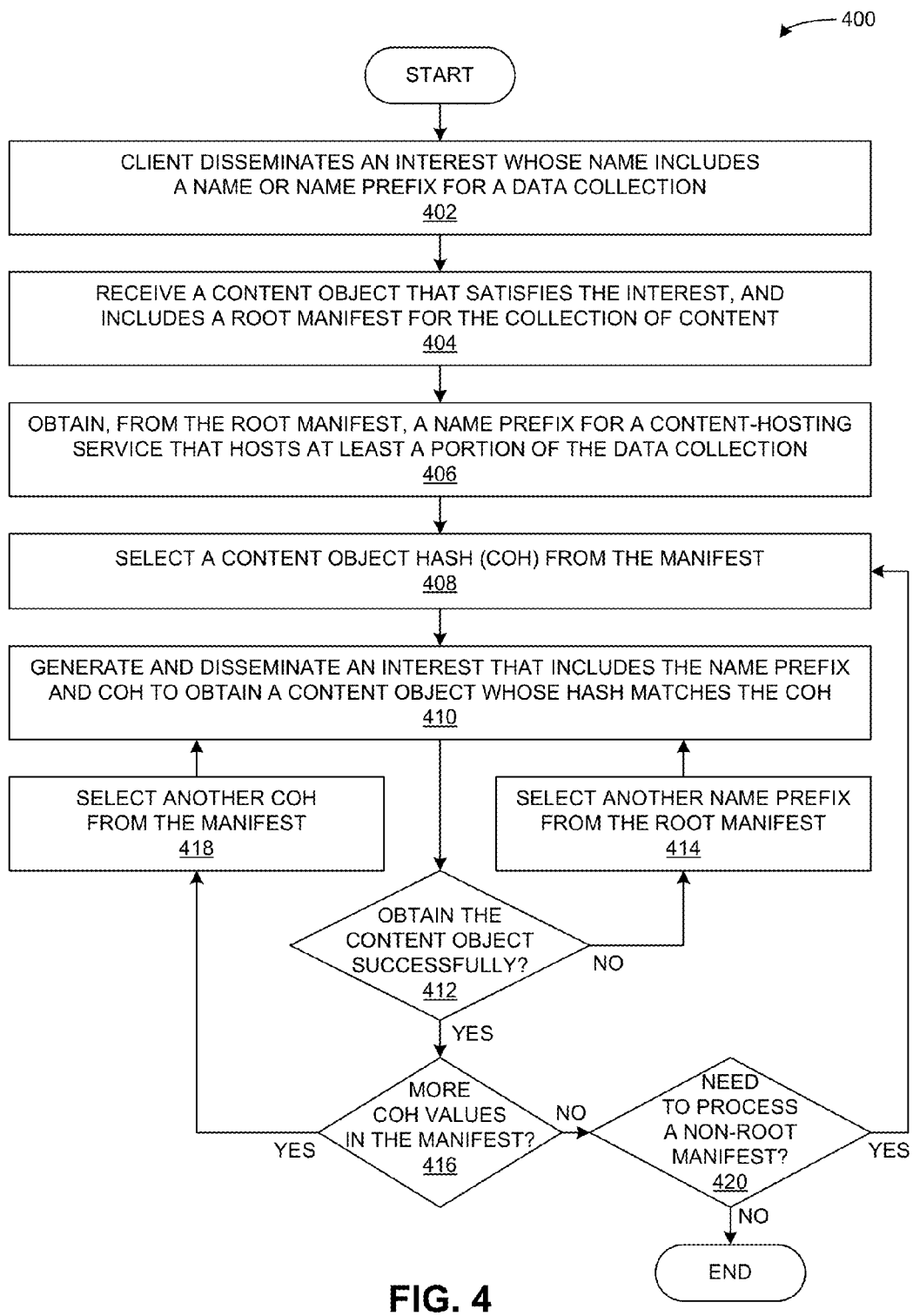
FIG. 4 presents a flow chart illustrating an exemplary method for requesting a data collection of nameless objects over a content centric network in accordance with an embodiment.

FIG. 4 presents a flow chart illustrating an exemplary method 400 for requesting a data collection of nameless objects over a content centric network in accordance with an embodiment. During operation, a client can disseminate an Interest whose name includes the name prefix for a data collection (operation 402). The data collection can include a single nameless Content Object, or can include a plurality of nameless Content Objects associated with a common name prefix. Other network nodes of the content centric network use the Interest's name to forward the Interest to any target node that advertises a name that matches the Interest's name or name prefix. This target node can include the publisher of the data collection, or any peer network node (e.g., a router) that caches Content Objects from various publishers or content producers.

Recall that the data collection includes a plurality of nameless Content Objects, and a root Manifest that includes both a name and a signature. Hence, when the Interest reaches a network node associated with the data collection's name prefix (e.g., the publisher or a peer node), this network node can return a Content Object that includes the root Manifest to satisfy the Interest. This Content Object is then forwarded along the path traversed by the Interest, but in the reverse direction, at which point the client receives the Content Object that includes the root Manifest for the data collection (operation 404).

The root Manifest includes Content Object hash values for one or more nameless Content Objects, such as the data objects or the non-root Manifests, and also includes name prefixes for one or more content-hosting services that host at least a portion of the data collection. The client then obtains, from the root manifest, a name prefix for a content-hosting service for the data collection (operation 406), and selects a Content Object hash (COH) self-certifying name from the Manifest (operation 408). The client then obtains a nameless Content Object whose hash matches the selected COH value by generating and disseminating an Interest that includes the name prefix for the content-hosting service, and that also includes the COH value (e.g., appended to the name prefix for the content-hosting service) (operation 410).

In some embodiments, it is possible that the content-hosting service(s) which have advertised the current name prefix may not be caching a nameless Content Object whose hash value matches the selected COH value. If this is the case, the client may need to use a different name prefix to reach other content-hosting services that may be caching the nameless Content Object. For example, the client can generate the Interest for the COH value using the first name prefix in the root Manifest, and proceeds to use the other name prefixes in the root Manifest whenever the client fails to obtain a Content Object for the Interest (e.g., in the order in which they appear in the root Manifest). Hence, if the client does not receive a Content Object that satisfies the Interest from operation 410 (e.g., within a predetermined timeout period) (operation 412), the client can select a name prefix for another content-hosting service from the root Manifest for the data collection (operation 414), and can return to operation 410 to generate and disseminate another Interest for the COH value using this new name prefix.

If the client does receive the nameless Content Object that corresponds to the COH value, the Content Object can proceed to disseminate Interests for other nameless Content Objects referenced in the Manifest. For example, the client can determine whether there exist more COH values in the Manifest (operation 416). If so, the client can select another COH self-certifying name from the Manifest (operation 418), and returns to operation 410 to generate and disseminate another Interest for this other COH self-certifying name. In some embodiments, the client can generate the Interest for this other COH self-certifying name using the first name prefix in the root Manifest. Alternatively, the client can generate the Interest for the other COH using the same name prefix that was used to request the last nameless Content Object in the data collection.

Recall that some of the nameless Content Objects in the data collection can include non-root Manifests. These non-root Manifests include additional COH self-certifying names for Content Objects in the data collection, but may not include additional name prefixes for other content-hosting services. Hence, the client can repeat operations 408-416 to process each additional non-root Manifest that it receives (which may form a hierarchy of Manifests) using the COH names from each additional non-root Manifest and the name prefixes from the root Manifest. For example, if the client determines that there are no more COH names in the current Manifest (operation 416), the client can proceed to determine whether there exists a non-root Manifest to process (operation 420). If so, the client can return to operation 408 to process this next non-root Manifest.

Content-Hosting Service

In some embodiments, CCN nodes can process an Interest for a nameless Content Object by forwarding the Interest toward a content-hosting service associated with the Interest's name prefix. The content-hosting service can include, for example, a replica server (or collection of servers) that replicate data collections for one or more publishers, or any third-party service (e.g., a promiscuous caching service run by an Internet Service Provider (ISP)) that stores and hosts one or more nameless Content Objects. A third-party service can receive the nameless Content Objects directly from the publisher, from another third-party service, or can cache the nameless Content Objects as they are in transit along a return path to client devices that request these nameless Content Objects (e.g., a CCN routing node or gateway).

In some embodiments, the publisher provides one or more nameless Content Objects of a collection to the third-party service, the publisher may generate the root Manifest for the collection of Content Objects to include a name prefix for the third-party service. In this case, the third-party service may also receive the root Manifest, which includes a name prefix for the collection, from the collection's publisher. The third-party service can provide this root Manifest to any entity that may wish to obtain the collection of Content Objects from the third-party service, or any of the other servers listed in the root Manifest.

However, the third-party service may not always receive the collection from the publisher. In some variations, the third-party service can create its own root manifest for the collection so that the root Manifest includes a name prefix associated with the third-party service. The third-party service can incorporate an existing root Manifest (e.g., the original root Manifest) by reference or inclusion. A consumer can use the third-party service's name prefix to request the collection because the nameless Content Objects in the collection still have hash values that match the COH values as in the existing, trusted, root Manifest. After receiving the collection, the consumer can use the original (trusted) root Manifest to validate the collection. Thus, a third-party service can host nameless Content Objects, using its own name prefix, even if the third-party service is not an official (trusted) source for the collection, and even if the third-party service was not included in the original root Manifest.

If incorporating the existing root Manifest by reference, the third-party service can generate the new root Manifest to have a payload that includes a name prefix for the root Manifest, as well as the Content Object hash (COH) self-certifying name for the existing root Manifest. Note that the name prefix to the root Manifest can include the third-party service's own name prefix (if hosted locally), the publisher's name prefix, and/or the name prefix for any other third-party service that hosts the existing root Manifest. On the other hand, if incorporating the existing root Manifest by inclusion, the third-party service can generate the new root Manifest to have a payload that includes the name prefix for the third-party service, as well as the existing root Manifest (which includes other name prefix and the COH values for the collection).

For example, a client can use the original root Manifest to download the collection, and to validate the authenticity of the collection. If the client (or its user) wants to re-publish (host) the collection, the client can generate publish its own root Manifest with a signature signed by the client, and incorporates the original Manifest so that other clients can validate the authenticity of the nameless Content Objects served by the local client. The client can share this new root Manifest with others, such as via email, a Web link, or a peer-to-peer tracker. Other clients can download the collection (or a portion thereof) from the local client via that new root Manifest, even though the local client's name prefix is not listed in the "official" or "trusted" root Manifest.

Figure 5:
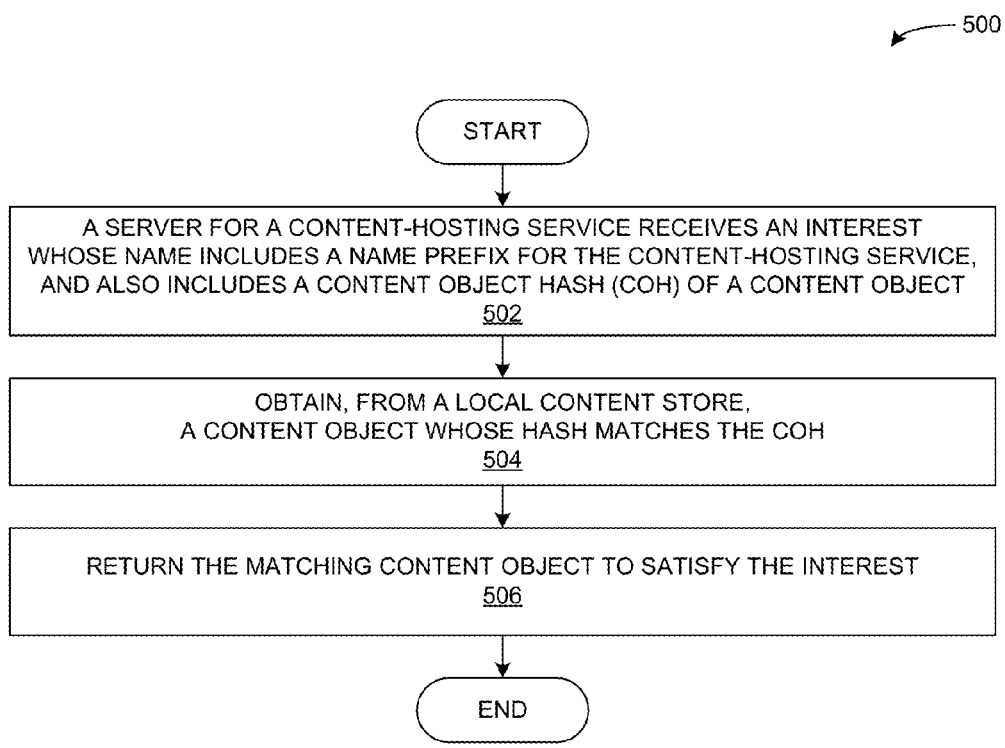
FIG. 5 presents a flow chart illustrating an exemplary method for processing an Interest message that requests a nameless object in accordance with an embodiment.

Servers of the content-hosting service can process the Interest by matching the Interest's Content Object hash (COH) self-certifying name to a cached Content Object's hash, regardless of the Interest's name prefix. FIG. 5 presents a flow chart illustrating an exemplary method 500 for processing an Interest message that requests a nameless object in accordance with an embodiment. During operation, a server of the content-hosting service can receive an Interest whose name includes a name prefix for the content-hosting service, and also includes a COH value (a self-certifying name) of a nameless Content Object (operation 502). The server then obtains, from a local Content Store, a nameless Content Object whose hash matches the COH value in the Interest, without regard to the Interest's name prefix (operation 504). The server then returns the matching nameless Content Object to satisfy the Interest (operation 506).

In some embodiments, the server returns the nameless Content Object via a face from which the server received the Interest. Also, other CCN nodes forward the nameless Content Object along the path traversed by the Interest, in the reverse direction, based on the nameless Content Object's hash. For example, when a CCN node receives the nameless Content Object, the CCN node can determine a face to use to forward the nameless Content Object by performing a lookup in a Pending Interest Table (PIT) to match the nameless Content Object's hash to a COH value in a pending Interest, regardless of the name prefix in these pending Interests.

Figure 6:
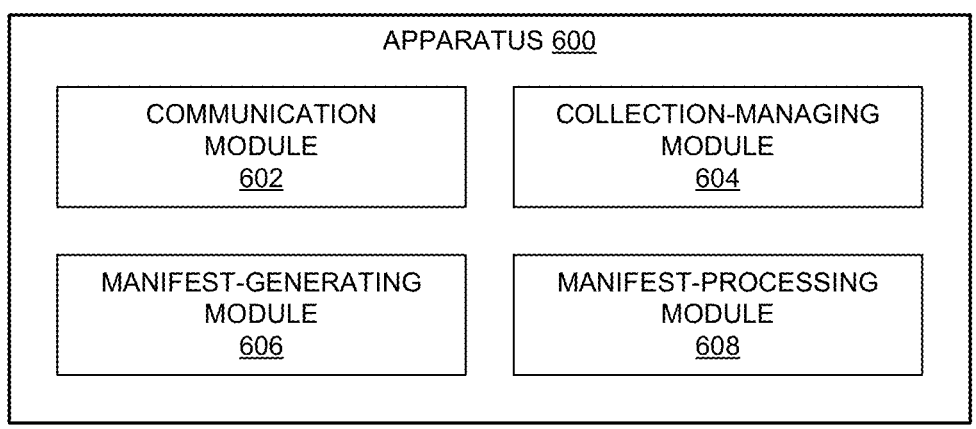
FIG. 6 illustrates an exemplary apparatus that facilitates replicating nameless objects across a plurality of content-hosting services in accordance with an embodiment.

FIG. 6 illustrates an exemplary apparatus 600 that facilitates replicating nameless objects across a plurality of content-hosting services in accordance with an embodiment. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise a communication module 602, a collection-managing module 604, a manifest-generating module 606, and a manifest-processing module 608.

In some embodiments, communication module 602 can disseminate and/or receive CCN Interests and Content Objects. Collection-managing module 604 can add data to a collection by generating nameless Content Objects for the data, and inserting these nameless Content Objects to the collection. Manifest-generating module 606 can generate Manifests (e.g., a hierarchy of Manifests) for the nameless Content Objects, and can add these Manifests to the collection. Manifest-processing module 608 can process a Manifest for a data collection to generate and disseminate Interests that request nameless Content Objects in the collection based on their hash value.

Figure 7:
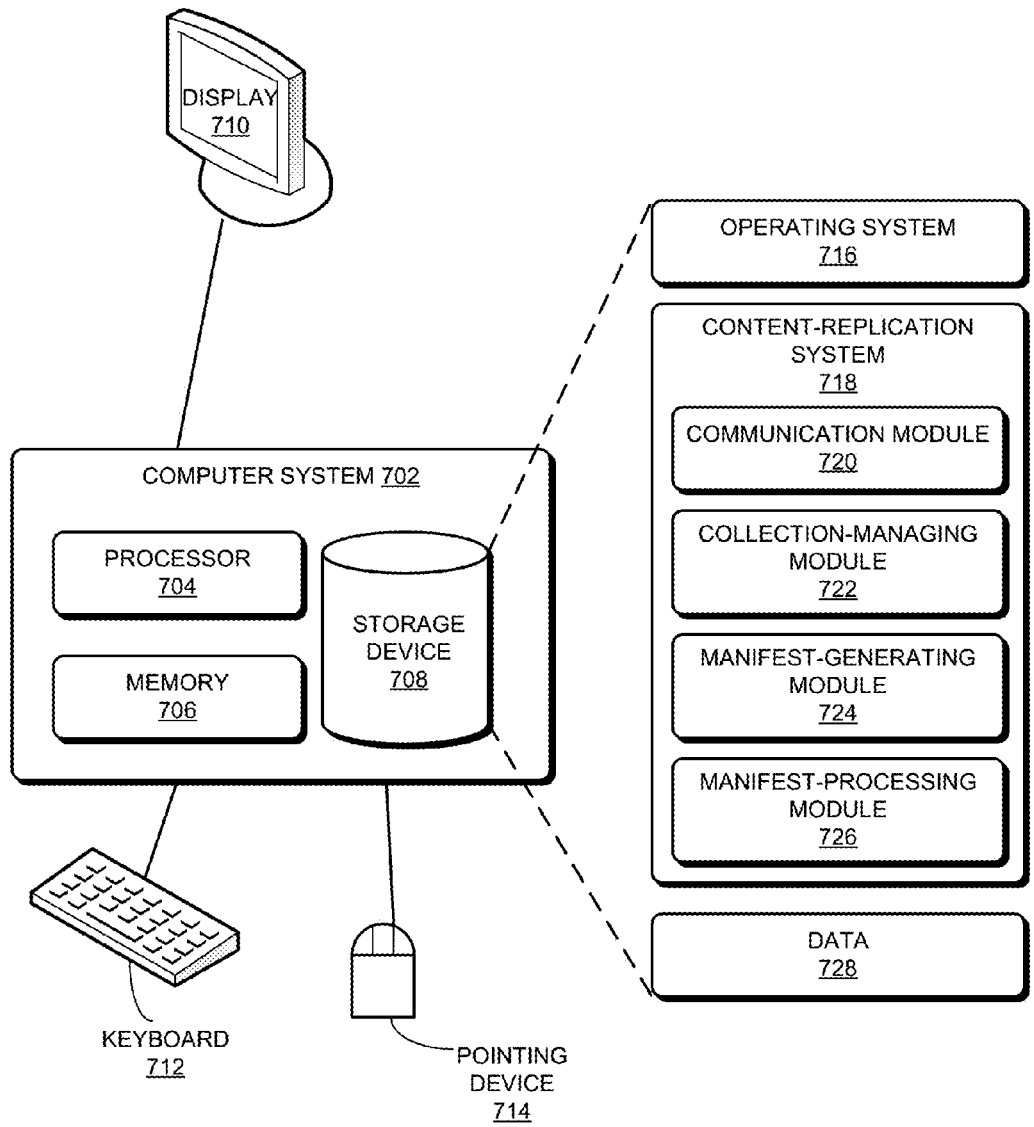
FIG. 7 illustrates an exemplary computer system that facilitates replicating nameless objects across a plurality of content-hosting services in accordance with an embodiment.

FIG. 7 illustrates an exemplary computer system 702 that facilitates replicating nameless objects across a plurality of content-hosting services in accordance with an embodiment. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store operating system 716, a content-replication system 718, and data 728.

Content-replication system 718 can include instructions, which when executed by computer system 702, can cause computer system 702 to perform methods and/or processes described in this disclosure. Specifically, content-replication system 718 may include instructions for disseminating and/or receiving CCN Interests and Content Objects (communication module 720). Further, content-replication system 718 can include instructions for adding data to a collection by generating nameless Content Objects for the data, and inserting these nameless Content Objects to the collection (collection-managing module 722). Content-replication system 718 can also include instructions for generating Manifests (e.g., a hierarchy of Manifests) for the nameless Content Objects, and adding these Manifests to the collection (manifest-generating module 724). Content-replication system 718 can also include instructions for processing a Manifest for a data collection to generate and disseminate Interests that request nameless Content Objects in the collection based on their hash value (manifest-processing module 726).

Data 728 can include any data that is required as input or that is generated as output by the methods and/or processes described in this disclosure. Specifically, data 728 can store at least a collection of nameless Content Objects, a hierarchy of Manifests for the nameless Content Objects.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
disseminating an Interest for a data collection;
receiving a Content Object that includes a manifest for the data collection, wherein the manifest includes Content Object hash (COH) values for a set of other Content Objects of the data collection;
determining a name prefix for a content-hosting service that hosts at least a portion of the data collection;
generating a second Interest for a respective Content Object of the data collection, wherein a name for the second Interest includes the name prefix for the content-hosting service, does not indicate a name for the respective Content Object, and includes a COH value for the respective Content Object;
disseminating the second Interest to obtain the respective Content Object of the data collection; and
verifying the obtained respective Content Object by determining that a computed hash of the respective Content Object matches the COH value included in the name for the second Interest.

2. The method of claim 1, wherein the other Content Objects of the data collection do not include a name, and are accessed based on their Content Object hash value.

3. The method of claim 1, wherein the manifest includes a root manifest that specifies a name prefix for one or more content-hosting services that host at least a portion of the data collection.

4. The method of claim 3, wherein the root manifest includes a signature for the root manifest.

5. The method of claim 3, wherein determining the name prefix for the content-hosting service involves obtaining the name prefix from the root manifest.

6. The method of claim 1, wherein the manifest includes a non-root manifest.

7. The method of claim 6, wherein the non-root manifest does not include a name.

8. The method of claim 6, wherein the non-root manifest does not include a signature for the non-root manifest.

9. The method of claim 6, wherein obtaining the name prefix for the content-hosting service involves obtaining the name prefix from a root manifest associated with the data collection.

10. The method of claim 1, wherein the other Content Objects of the data collection include a set of non-root manifests, or a set of data Content Objects.

11. A non-transitory computer-readable storage medium storing instructions that when executed by a computer cause the computer to perform a method, the method comprising:
disseminating an Interest for a data collection;
receiving a Content Object that includes a manifest for the data collection, wherein the manifest includes Content Object hash (COH) values for a set of other Content Objects of the data collection;
determining a name prefix for a content-hosting service that hosts at least a portion of the data collection;
generating a second Interest for a respective Content Object of the data collection, wherein a name for the second Interest includes the name prefix for the content-hosting service, does not indicate a name for the respective Content Object, and includes a COH value for the respective Content Object;
disseminating the second Interest to obtain the respective Content Object of the data collection; and
verifying the obtained respective Content Object by determining that a computed hash of the respective Content Object matches the COH value included in the name for the second Interest.

12. The storage medium of claim 11, wherein the other Content Objects of the data collection do not include a name, and are accessed based on their Content Object hash value.

13. The storage medium of claim 11, wherein the manifest includes a root manifest that specifies a name prefix for one or more content-hosting services that host at least a portion of the data collection.

14. The storage medium of claim 13, wherein the root manifest includes a signature for the root manifest.

15. The storage medium of claim 13, wherein determining the name prefix for the content-hosting service involves obtaining the name prefix from the root manifest.

16. The storage medium of claim 11, wherein the manifest includes a non-root manifest.

17. The storage medium of claim 16, wherein the non-root manifest does not include a name.

18. The storage medium of claim 16, wherein the non-root manifest does not include a signature for the non-root manifest.

19. The storage medium of claim 16, wherein obtaining the name prefix for the content-hosting service involves obtaining the name prefix from a root manifest associated with the data collection.

20. The storage medium of claim 11, wherein the other Content Objects of the data collection include a set of non-root manifests, or a set of data Content Objects.

21. A computer-implemented method, comprising:
receiving, by a server of a content-hosting service, an Interest whose name includes a name prefix for the content-hosting service, and also includes a Content Object hash (COH) value for a Content Object hosted by the content-hosting service;
obtaining the Content Object whose hash matches the COH value; and
returning the Content Object, along a face from which the Interest was received, to satisfy the Interest.

22. The method of claim 21, wherein the Content Object does not include a name.

23. The method of claim 21, wherein the Content Object does not include a signature.

24. The method of claim 21, wherein the Content Object includes one or more of:
metadata; and
a payload.

25. The method of claim 21, wherein the Content Object includes a manifest for a data collection, wherein the manifest includes COH values for a set of other Content Objects of the data collection.

* * * * *